June 2, 1931.　　　　E. UHER, JR　　　　1,808,123.
METHOD OF PRODUCING PHOTOGRAPHED PRINTING FORMS
Filed March 29, 1929
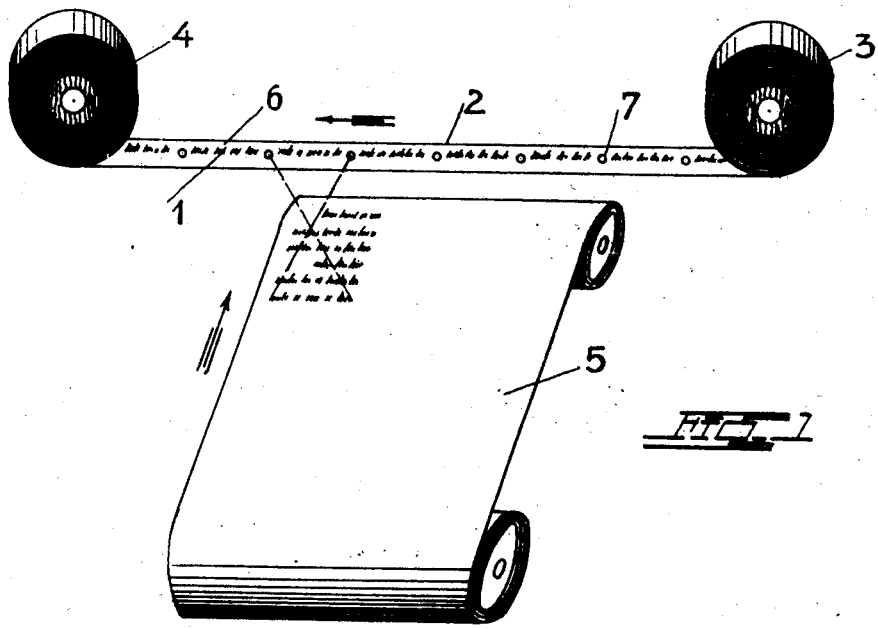
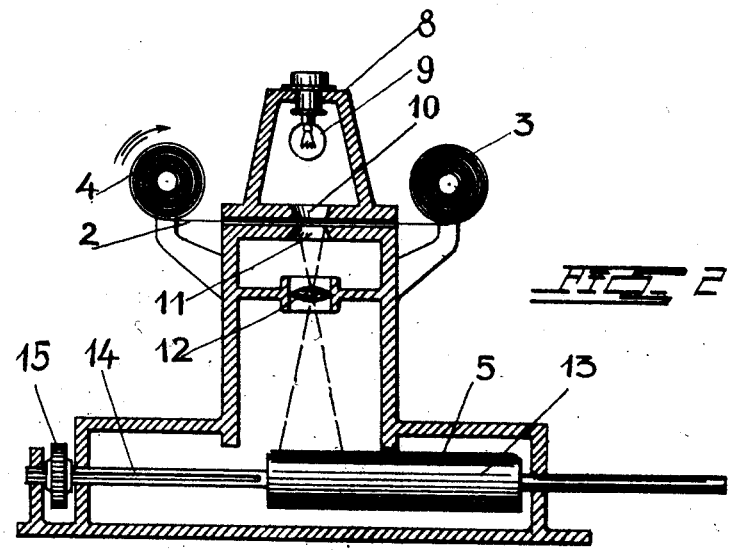
E. Uher Jr.
INVENTOR Patented June 2, 1931

1,808,123

UNITED STATES PATENT OFFICE

EDMUND UHER, JR., OF BUDAPEST, HUNGARY

METHOD OF PRODUCING PHOTOGRAPHED PRINTING FORMS

Application filed March 29, 1929, Serial No. 351,010, and in Germany July 29, 1927.

The invention refers to a method of performing by photographic means the operation of page or column setting occurring in the production of printed matter which operation consists in arranging the line units received from the compositor into columns and pages or, in short, to a method of making up composed matter into page or column form by photographic means.

The substance of the invention consists in the method of effecting the arrangement of lines and other page or column setting units in an indirect manner with the aid of intermediate model prints, and in methods for producing, handling and subdividing such intermediate model prints and for adjusting their position relative to the means of projection.

The drawings illustrate by way of example embodiments of the invention in a diagrammatic manner.

Fig. 1 is a perspective view of a portion of an intermediate model print and a page sheet, and Fig. 2 is a cross section of a device for enabling the novel process to be performed.

According to the invention the transfer by photographic means to the page sheet of the composed matter desired to be made up into columns and pages is not effected in a direct manner from the original types or lines composed of types, but in an indirect manner from an intermediate model print on which the line has previously been imprinted by any convenient method, the preparation of said model point being accordingly the first step in the process.

It is true that the interposition of intermediate model prints entails an additional new operation. It enables, however, a freer distribution and easy correction to be ensured. The rough intermediate model prints of the individual lines represent the smallest distribution units, and can be manipulated and changed, in the same manner as single type.

As can be seen from Fig. 1, the lines of the intermediate model print 1 are arranged successively in continuous alignment with the first line, so as to form a strip 2, which is inelastic and easily handled, being for example, unwound from a roller 3 on to a roller 4. It is preferably a band of film, on which the intermediate model print has been composed by photography, and then developed and fixed, prior to beginning the operation of photographing it on the page sheet 5. The intermediate model prints may be produced either in the form of a positive or negative, as desired.

According to the invention, the image of a line 1 on the strip 2 of this intermediate model print is projected on to a photosensitive sheet 5, in the requisite manner, as shown by the broken lines, the strip 2 being moved longitudinally every time in a manner corresponding to the feed movement of the page sheet 5, and transversely thereto, and is photographed on to the latter. The feed movements, which are preferably at the rate of a line each time, are indicated by arrows.

The lines of the intermediate model print 1 succeed each other on the strip 2 with blank intervals 6 of equal length, which enable interlineations to be pasted on with overlapping or the like. In making corrections all that is needed, therefore, is to paste in a new line or image into the intermediate model print, and the strip 2 may also be subdivided in any other way and patched like bands of film in known manner.

The intermediate model print strip 2 is provided, in the blank spaces 6, with equidistant perforations 7, by means of which it can be fed forward, by means of toothed cylinders or gripping devices as employed for driving motion picture films. The perforations may be replaced by notches, stops, drivers, contacts or other means of actuation.

Fig. 2 shows a typical device for the production of photographed pages or columns. In addition to the parts already described, the casing 8 is seen to contain the lamp 9, employed as a source of light for the purpose of projection, the picture opening 10, 11, which effects the straightening out of the inelastic film strip 2, the lens 12 and a longitudinally displaceable and rotatable page-sheet drum 13, with shaft 14 and drive 15. The device enables the process to be carried out with mechanical uniformity.

When the intermediate model print strip 2 is disposed, as shown, in a plane parallel to the page sheet 5, and in any convenient position in relation thereto, the lines can be arranged to suit the page size for the time being, at convenience. If necessary, the strip 2 can be subdivided into sections representing separate lines, in order to enable the distribution to be effected with the greatest freedom.

According to the invention, the photo-composing machine of which use has been made by the compositor in composing the lines, need not possess any arrangement for line spacing; nor is it necessary that it should possess more than one standard size for each kind of script. The line spacing and also the magnification are obviously attainable by the described method of making up columns, pages and other units of printed matter. According to the invention, individual lines 1 on the same intermediate model print strip 2 can be reproduced in different magnifications on the same photo-sensitive page sheet 5, so that there is also a free hand with reference to the size of type where required.

The invention allows unrestricted freedom of distribution of the lines or other distribution units. For example, in the case of fresh editions of a work, the whole can be revised or rearranged with the aid of the original intermediate model print strip, fresh matter inserted, other portions omitted, and so forth. Illustrations can be inserted anywhere in the text and may even be arranged on intermediate model print strips in the same manner as the lines of type.

When in the claims the term "lines" is used, this is intended to include any other kind of distribution units.

What I claim is:

1. The method of producing photographed printing forms from lines, which consists in first composing the lines by photographic means on a non-elastic film band in succession and in continuous alignment with the first line thereon, so as to form an intermediate model print and thereafter photographing the lines individually in the desired order, from the intermediate model print on to a sensitized form.

2. The method of producing photographed printing forms from lines, which consists in first printing off the lines by any convenient means, in succession and in continuous alignment with the first line thereon so as to form an intermediate inelastic model print, intervals of uniform length enabling division of the carrier being provided for the purpose of spacing the units of the intermediate model print on the carrier, and thereafter photographing the lines individually, in the desired order from the intermediate model print on to a sensitized form.

3. The method of producing photographed printing forms from lines, which consists in first printing off the lines by any convenient means on a carrier in succession in continuous alignment with the first line thereon, so as to form an intermediate model print, spacing the units of the intermediate model print on the carrier, imparting a feed movement, in the direction of its own longitudinal dimension, to the carrier of the intermediate model print, and at the same time also imparting a feed movement to the page sheet in the direction of the longitudinal dimension of said sheet, but at a right angle to the longitudinal dimension of the carrier, both feed movements being effected preferably from line to line in an intermittent manner.

4. In the method of producing photographed printing forms from lines, which consist in first printing off the lines by any convenient means, on a carrier in succession in continuous alignment with the first line thereon, so as to form an intermediate model print, as described in claim 3, the added step of providing means for bringing the intermediate model print carrier into any desired position relatively to the page sheet, such position being situated in a plane of adjustment which is parallel to the page sheet.

In testimony whereof I have signed my name to this specification.

EDMUND UHER, Jr.